United States Patent Office 3,243,252
Patented Mar. 29, 1966

3,243,252
PROCESS OF METHYLENATING CELLULOSE TEXTILES EMPLOYING A CATALYST MIXTURE OF ACID, ACID SALT AND REDUCING AGENT
Henry R. Hushebeck, Wilmington, Del., assignor to Joseph Bancroft & Sons Co., Wilmington, Del., a corporation of Delaware
No Drawing. Filed May 18, 1961, Ser. No. 116,637
7 Claims. (Cl. 8—116.3)

This invention relates to the catalyzation of the reactions of cellulose with formaldehyde and related substances which introduce methylene cross linkages in cellulose: e.g.

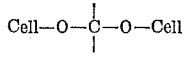

Certain aspects of this invention are particularly concerned with the utilization of such methylenation reactions and techniques in the treatment of cellulosic textile products to impart thereto new and enhanced properties and characteristics. Still other aspects of the invention are concerned with compositions of matter which are useful as catalysts for the methylenation reactions or which facilitate the carrying out of the methylenation techniques.

The present invention is, in certain respects, a modification, improvement and extension of inventions disclosed and claimed in my co-pending applications:

| Serial No.: | Filing date |
|---|---|
| 762,934 | September 24, 1958, now forfeited. |
| 804,857 | April 17, 1959, now abandoned. |
| 804,858 | April 17, 1959, now U.S. Patent 3,139,322. |
| 838,823 | September 16, 1959, now U.S. Patent 3,186,954. |
| 94,111 | February 17, 1961, now U.S. Patent 3,165,374. |

As used herein, the terms cellulose and cellulosic refers to materials having a natural or regenerated cellulose base (including, but not limited to, cotton and rayons and to mixtures thereof with one another or with synthetics) [in the form of fibers, filament, yarns, threads], fabrics, etc., or in the form of finished yarn products.

The terms "methylenation reactions" and "methylenating reactions," as used herein, should not be construed as being limited to the introduction of crosslinking —$CH_2$— in cellulosics by reactions with formaldehyde, but is also intended to refer to the reactions between cellulosics with such complex aldehyde compounds as glyoxal, α-hydroxy-adipaldehyde gluteraldehyde, and also with materials or compounds which, upon heating, especially in the presence of acid, liberate free aldehydes—the methylol acetones and other methylol ketones, para formaldehyde, trioxane, and the like are typical of aldehyde liberants which are use materials in the finishing and treatment of textiles. Even with the more complex aldehydes, the crosslinking reaction probably introduces a single carbon crosslink between glucose residues.

It is one of the objects of this invention to provide a composition of matter which is useful as a catalyst for the methylenation of cellulose and which is especially useful in the methylenation of cotton textiles by reacting the textile material with formaldehyde.

It is also an objective of this invention to provide new pad bath compositions which are particularly useful in the conventional fabric finishing operations involving padding, drying, curing and washing of a textile web.

It is another object of this invention to provide a process for the methylenation of natural cellulose, a textile material, whereby the treatment will confer on the textile such desirable properties as wet and dry resilience, self-ironing properties and stabilization of the material as against shrinkage; and furthermore that such properties are conferred to given levels of improvement while retaining more of the original tensile strength than could heretofore be retained in treatments of cottons with formaldehyde.

It is still another object of this invention that the process provided be one which in commercial mill operations can be used in conventional pad, dry cure and wash operations and will result in more uniform and controllable treatment from the standpoint of desirable property enhancement.

Another object of the invention is to provide a process for finishing cellulose fabrics and textiles to impart thereto the desirable property enhancement of partial controlled methylenation and either simultaneously or sequentially provide the desirable properties achieved by resination.

Other objects and advantages will appear in the detailed description of my invention which follows:

In accordance with this invention, these objectives and advantages are achieved by the use of curing catalysts for methylenating reactions which contain, in addition to an acid providing component, a neutral or mildly alkaline reducing agent whose reducing activity is in the anionic portion of the molecule and especially those reducing agents which alone in aqueous solution will provide a pH of at least 6.5.

As will be pointed out in greater detail hereinafter, the catalyst compositions of this invention are especially useful and beneficial in connection with the formaldehyde finishing of textiles, and particularly cotton fabrics. Therefore, the invention will be primarily illustrated in terms of a conventional pad bath finishing process as carried out on a web of fabric; however, by so describing the invention it is not intended that the invention should be construed as being limited to the specific techniques used for illustrative purposes since both the catalyst itself and the process of the invention can also be beneficially employed in connection with methylenation reactions whether they be in connection with the textile industry or some other application involving such reactions.

Even as to textile finishing processes, there are many variations thereof in which the techniques of the present invention will be found to be useful; all, however, have a common procedural similarity in that at some stage, after a reactable aldehydic finishing agent has been applied to the material, it is cured by heating in the presence of an acidic or acid providing catalyst which can accelerate the reaction. Therefore, in most instances, I will use the conventional finishing process involving padding, drying, curing and washing to illustrate the techniques of the present invention.

To describe the so-called conventional pad bath treatment in somewhat greater detail, the fabric web, customarily in the "pure" (greige goods which have been singed, desized, scoured, bleached, and washed to render them uniformly absorbent) form, either mercerized or unmercerized, is impregnated in a pad bath and mangled with a solution containing the finishing agents. By controlling the concentration of the finishing agents in the pad bath and adjusting the solution pick-up, a given concentration of finishing impregnants can be applied to or brought into intimate contact with the fabric. Usually, it is desirable to operate under conditions which will provide a solution pick-up of about 65%; and pick-ups of the order of 50–90% are not uncommon in the textile finishing art. To simplify operations, it is customary for both the finishing agent and its curing catalyst to be deposited from the same bath. Other textile auxiliaries such as softeners, brighteners, tinting agents, and other property modifiers which it may be desirable to incorporate in the fabric at this stage can also be included in the pad bath. The impregnated fabric is cured by heating. To effect the cure, in conventional ovens, temperatures are usually employed which will enable the curing to be completed in about 30 minutes or less. However, in some instances, it is possible to effect the cure over longer periods provided special equipment and techniques are employed; in most cases conventional curing equipment will permit the employment of time-temperature relationships between and comparable to those effected by 30 minute cures at 185° F. and 30 second cures at 400° F.

The use of aldehydes as textile finishing agents is not per se a new technique as the reactions of aldehydes with cellulose have a rather ancient origin and involve a long history of efforts to effectively control the reaction to a point where commercial processing of cotton with formaldehyde was feasable. Theoretically, it is possible to react cellulose with a quantity of formaldehyde equal to about 17.2% of the weight of the cellulose. Introducing this quantity of formaldehyde into a cellulose fabric is a totally impractical procedure—the fabric will be completely destroyed. Many of the older fabric finishing processes utilizing formaldehyde as a stabilizing influence required the reaction of formaldehyde in quantities in excess of 2% in order to obtain the desired results. However, in order to get such quantities of formaldehyde permanently into the fabric required unduly harsh curing conditions which degraded the cellulose to a point where the resultant fabric was exceptionally tender. Probably the most objectionable feature of the methylenation processes heretofore proposed was the fact that the reaction was very unpredictable and exceedingly difficult to control. In cotton finishing process proposals utilizing methylenating agents such as formaldehyde and ketone-aldehyde precondensates, the conventional catalysts were totally unsatisfactory even though extreme efforts were made to regulate the curing conditions. It was practically impossible to obtain uniform properties throughout the fabric; some portions would be objectionably tendered and in other portions, the degradation would be less perceptible; the resilience, durability and other properties were also found to vary quite unpredictably. With the advent of the much more readily controllable thermosetting resins as fabric stabilizing agents, the efforts to use formaldehyde as a finishing agent for cotton gradually decreased to a point where in recent years only academic interest had been shown in methylenation reactions; and this, despite the known desirability using formaldehyde and other methylenating agents as stabilizing agents. The difficulty of effectively controlling the methylenation process are so great and unpredictable that, until the advent of the special catalyst system and techniques described in my co-pending applications listed in the foregoing portion of this application and particularly in application No. 838,823, methylenating agents, per se, were not used in commercial cotton finishing operations.

As described in my aforementioned applications particularly in Serial No. 838,823, some of the deficiencies of prior art methylenation techniques could be overcome by using a catalyst system comprising an acid component and an acid salt component, which components, under the heating employed to cure the aldehyde impregnated fabric, are capable of forming in the fabric a residue which imparts to the fabric a lower acidity (higher pH) than that of the acid-acid salt combination prior to heating.

In general, the special methylenation catalyst systems of the 838,823 application which are useful for the purposes of the present invention have an acid component and an acid salt component, the acid salt component being one which alone is capable of providing a methylenation curing environment at temperatures above about 300° F., and the acid component is one having an anionic portion which at elevated temperatures (e.g., above about 200° F.) is capable of combining with the cationic portion of the acid salt and form a residue or compound having greater basicity than that of the acid salt component and the acid-acid salt combination being further characterized in that the acid component is one having acidity characteristics enabling it to augment during curing, the acidity developed by the thermal decomposition of the acid salt to a degree that an acid methylenating environment can be formed at a considerably lower temperature (e.g., above about 200° F.) than that at which the acid salt is operable.

With respect to the acid component for use in the catalyst system of the 838,823 application, it may be an organic or inorganic acid such as maleic, tartaric, phosphoric, citric, itaconic, succinic, and the like, or an acid anhydride. It is preferred, however, to employ polybasic acids, and especially non-volatile organic acids, which themselves (either due to their inherent acid characteristics or due to the concentrations in which they are employed) are incapable of catalyzing methylenation reactions significantly. In general, the acid component augments the acid liberated from the acid salt and in some cases will promote the liberation of acid from the acid salt component. Acids having an acidity at least equal to that of a 0.1% citric acid solution have been found to be capable of effectively augmenting the acid environment developed by the thermal decomposition of certain metallic salts such as magnesium nitrate, strontium nitrate, aluminum chloride, zinc chloride, sodium bisulfate, zirconium oxychloride, aluminum acetate, chromium acetate, and the like. Catalyst systems prepared from the specified acid-acid salt combinations will enable the development of the desired degree of acidity for efficient finishing and without seriously degrading the fabric being treated.

Acids which are weakly acidic such as boric acid, regardless of its concentration, are not well suited for use in the acid-acid salt catalyst system as they do not permit efficent and satisfactory curing under the milder time and temperature relationships which can be employed under the teachings of the 838,823 application. Further, the weak acids which are readily volatile under the processing conditions, e.g., formic acid, cannot be effectively used as they will be driven off before a satisfactory cure can be effected. Another highly desirable characteristic of the acid component is that it should be an acid which, with the acid salt component, will not form a water insoluble residue during the heating to cure the treated fabric. Further, as will be pointed out hereinafter, the pH imparted by the residue to the cured fabric should be raised over that of the untreated fabric. In general, the useful acids are those which will provide a pH in the impregnating bath of from about 1.5 to 5.5.

The acid-acid salts combinations in the catalyst systems prepared in accordance with the 838,823 application function in a manner which is somewhat similar to that of the so-called "potentially acid" or "delayed action" catalysts used in the curing of thermosetting resins, in that at elevated temperatures an acid curing environment is formed by the thermal decomposition of the catalyst. However, unlike most of the conventional delayed action catalysts, the catalyst system of the 838,823 application the acid componenta and the acid salt component each have thermally stable reactable portions which are not volatized in developing the acid curing environment. During the cure, these stable portions react and form in the cured fabric a residue which has a higher pH than the pH of the impregnating bath.

The acid salt component constitutes the primary source of the acid developed in the curing environment, however, with most of the acid salts which have a thermally stable non-acid portion, the rate of acid liberation is too slow for purposes of methylenation catalysis at temperatures which can be effectively and efficiently utilized in textile finishing operations. In this connection, it should be kept in mind that aldehyde finishing impregnants are highly volatile and it is desirable to effect the cure at low temperatures (e.g., about 200°–300° F.) rather than at higher temperatures; and under no circumstances should curing temperatures be employed which could scorch the fabric undergoing treatment. Attempts to compensate for the slow rate of acid liberation by increasing the concentration of the acid salt, concurrently and significantly increases the danger of fabric damage—particularly strength losses—due to hydrolysis or acid degradation of the fabric. Hydrolysis or acid degradation involves changing the chemical nature of the textile material and the extent of hydrolysis is governed by several factors including the type of catalyst, its concentration, and the curing conditions (time and temperature) employed.

As previously noted, the acid salt component should be one which at temperatures above 300° F., will liberate or develop an acid curing environment; most metal salts of either oragnic or inorganic Lewis acids (i.e., electron acceptors) and especially the polyvalent metal salts of such acids have such characteristics and can be used in the catalyst system combination prepared according to the 838,823 application. The Lewis acid salts of monovalent metals with polybasic acids can also be used effectively. Where white goods are to be finished, it is preferred to employ those Lewis acid salts which form substantially colorless aqueous solutions. In addition, and because the acid salt includes a non-acidic component which is not volatilized, the useful acid-acid salt combinations are those which, when applied to a fabric as a pure aqueous solution of the catalyst components and heated to temperatures of about 185° to 400° F. (and preferably when heated to temperatures of about 250° to 300° F.) will form in the fabric a residue (preferably a water soluble residue) which will impart to the fabric a pH that is at least 2, and preferably about 2.3 or more points higher than the pH of the pure aqueous solution of the catalyst components.

According to the 838,823 application, the relative ratio of the acid component to the acid salt component can vary over a wide range provided that the combination is one which will develop, under the curing conditions involved, an acidity which is sufficient to enable finish effect to be fixed efficiently and predictably, and do this without objectionably degrading the fabric. As previously noted the preferred acid-acid salt combinations are those which alone and under the heating conditions involved, will form a residue in fabric which will impart thereto a pH which is at least 2 points higher than that of a pure aqueous solution of the catalyst components. Combinations of many different acids with many different types of Lewis acid salts in many widely varying ratios will be found to give this inverse pH relationship and the formulations given in Table I will serve to illustrate some typical and particularly useful combinations which have been found to give an optimum balance of properties when used for curing natural cellulose impregnated with aldehyde finishing agents.

TABLE I

| Acid | Acid Salt | Parts of Salt per Part Acid | | | Bath Conc., #/100 gal. at optimum acid-acid salt value | |
|---|---|---|---|---|---|---|
| | | Low | Optimum | High | Acid | Acid Salt |
| Citric | Magnesium Nitrate | 1 | 3.5 | 5 | 2 | 7 |
| Acrylic | do | 0.1 | 0.25 | 1.0 | 80 | 20 |
| Maleic Anhydride | do | 1.2 | 4.4 | 6 | 1.6 | 7 |
| Phosphoric | do | 3 | 9 | 13 | .75 | 7 |
| Tartaric | do | 1.5 | 3.9 | 5 | 1.8 | 7 |
| Itaconic | do | 1.5 | 3.9 | 5 | 1.8 | 7 |
| Citric | Calcium Nitrate | 1 | 6 | 8 | 2 | 12 |
| Do | Aluminum Chloride | 0.5 | 1 | 2 | 2 | 2 |
| Do | Zinc Chloride | 1 | 2 | 2.5 | 2 | 3.8 |
| Do | Chromium Acetate | 1 | 2 | 2.5 | 2 | 3.8 |

A few generalizations with respect to the acid components in Table I. Acrylic acid is weaker than citric acid and is used in greater concentration than citric acid to give the desired implementation to the curing environment developed by any given acid salt. Maleic anhydride is a stronger acid than citric acid and it is used in lower concentration than citric acid to implement the curing environment developed by any given acid salt.

As to the acid salt components, the nitrates of the polyvalent metals such as magnesium, calcium, barium and zinc, constitute a preferred group and within this group magnesium appears to give the best results but is closely followed by calcium, barium and zinc in the order mentioned. The chlorides can also be used, but they do not in all instances appear to work as well as the nitrates—probably due to readiness with which they liberate HCl. Because of their incompatability, strontium salts should not be employed in catalyst systems containing the hypophosphite ion.

Where the catalyst system is intended to be used for the finishing of natural cellulose fabric with aldehydes or with aldehyde liberating materials which do not exert strong buffering action, it is preferred to employ those systems which have the acidity characteristics below 185° F. which will not appreciably catalyze the methylenation reaction and which develop an acid methylenating environment at temperatures between 200° and 400° F. and especially between 250°–300° F. The preferred catalysts of the 838,823 application are those having acidity characteristics approximating those formed by the combination: citric acid (2 pounds), and magnesium nitrate hexahydrate (7 pounds) in impregnating baths containing about 3 to 12% of the aldehyde finishing agent made up to 100 gal. with water (i.e., the total catalyst system is approximately 1% of the weight of the bath). This system is sometimes hereinafter referred to as the 2–7 catalyst and it has been found especially useful for curing formaldehyde impregnated cottons. Such compositions will enable enhancement of properties such as resilience, wash and wear durability, shrinkage stabilization, etc., which are equal or superior to those obtained by curing under comparable conditions using 21 pounds magnesium nitrate alone. However, with the acid-acid salt combinations these benefits are obtained in a much more reproducible and predictable manner than where the salt alone is used as the catalyst.

I have now discovered that by combining certain reducing agents with acid catalysts, particularly those of the type disclosed and claimed in my application 838,823, which have just been described, still additional benefits and advantages are obtained when the new catalyst compositions are employed in the curing of aldehydes and cyclic methylol ureas when such materials are used as textile finishing impregnants—and especially when they are used in conjunction with the process and textile finishing techniques disclosed in my aforesaid co-pending applications: 838,823, 804,857, 804,858, 762,934, and 94,111.

Acid catalyst systems containing the reducing agents and prepared according to the present invention have also been found to be unusually effective in the curing of fabrics where in addition to the methylenating agent, the impregnating bath also contains a cyclic methylol urea (e.g., methylol ethylene ureas, methylol acetylene diureas, methylol dihydroxyethylene ureas and methylol triazones). The system of this invention is also unusually effective as a curing catalyst when the methylenation and resination with the aforementioned cyclic methylol ureas are carried out as sequential rather than simultaneous treatments. Such treatments with methylenating agents when coupled with resination give unusually superior strength values, coupled with exceedingly high resilience and wash and wear properties.

Further, the inclusion of certain reducing agents—namely, the hypophosphites—when used with any acid curing catalysts, generally appear to have beneficial results in other applications. For example, the use of a neutral or mildly alkaline reducing agent in a catalyst system for the acid curing of certain cyclic methylol ureas (e.g., methylol ethylene ureas, methylol acetylene diureas and methylol dihydroxyethylene ureas) significantly reduces the strength damage due to chlorine retention which occur when the treated fabric is subjected to severe washing and laundering with hypochlorite bleaches.

In accordance with this invention, the reducing agents which are useful components of an acid catalyst system for the curing of cellulosic methylenation reactions are those reducing agents whose reducing activity is in the anionic portion of the molecule, and which are substantially neutral or mildly alkaline—e.g., one which alone in aqueous solution will exhibit a pH of at least 6.5. Some specific examples of reducing agents of this type which have been found to be effective include the alkali and alkaline earth hypophosphites, nitrites, phosphites and bicarbonates. The corresponding bisulfites and sulfites have also been found to be useful, but where the end use involves the finishing of textiles, sulfur containing reducing agents are undesirable because of the danger of damage where zinc sours are employed in the laundering. Compounds containing the hypophosphite ion are especially desirable reducing agents for use in accordance with the present invention and of these sodium hypophosphite is preferred because of its cost and its water solubility. In this connection, it should also be observed that hypophosphorous acid alone can, in many instances, act in a dual capacity; it can provide the acidic curing environment as well as the reducing activity.

When the reducing agent is admixed with an acid-acid salt type catalyst, it is generally preferable that the cationic portions of the acid salt and of the reducing agent should be provided by different metals so as to avoid a "common ion" effect which in many cases, appears to negate fabric strength gains obtained by curing in the presence of the neutral or mildly alkaline reducing agent.

There is some evidence that the inclusion of the prescribed reducing agents tend to prevent the formation of a harsh curing environment and also they appear to provide for a more uniform distribution of crosslinking throughout the cellulose and in this way give rise to better wet resilience and wet wash and wear properties.

When the reducing agent is added to the acid-acid salt catalyst systems of the 838,823 application it is prefered to increase the total concentration of the acid-acid salt combination in the pad bath. For example, instead of using 2 pounds of citric acid and 7 pounds of magnesium nitrate in a 100 gal. impregnation bath (a preferred combination under the 838,823 application) it is desirable, when the neutral or mildly alkaline reducing agents are used in combination with the citric acid-magnesium nitrate system to employ 10 pounds of citric acid and 20 pounds of magnesium nitrate in a 100 gal. pad bath, as this will permit cures carried out at temperatures between 250°–300° F. to be completed within 5 to 3 minutes. Where other acid-acid salt combinations are employed adjustments are also necessary and the variations will follow generally the pattern of change noted for the citric acid-magnesium nitrate combination.

A prefered catalyst system prepared according to the present invention which gives optimum performance values in the curing of cottons impregnated with formaldehyde, is the so-called 10–20–16 system (i.e., 10 lbs. citric acid, 20 lbs. magnesium nitrate, and 16 lbs. sodium hypophosphite in a 100 gal. pad bath). In this system the weight ratio of the citric acid can be varied from 1 part citric acid to about 1 to 7 parts magnesium nitrate and the weight ratio of the citric acid to the soduim hypophosphite can vary from 1 part citric acid to about 0.6 to 2.4 parts sodium hypophospite, and still permit the attainment of the benefits of this invention. Further, in this regard, calcium hypophosphite and magnesium hypophosphite can be substituted for the sodium hypophosphite on a pound for pound basis; they are, however, more expensive and somewhat less soluble than the corresponding sodium compound, and if substitutions are effected "common ion" effects should generally be avoided.

Generally speaking when the concentration of the reducing agent is increased while holding the ratios of the acid and acid salt constant, best results are obtained by increasing the severity of the cure. The converse is also generally true, a less severe cure can be employed if the quantity of the reducing agent is lowered while holding the acid-acid salt concentration constant. Instead of increasing or decreasing the severity of the cure, changes in the concentration of the reducing agent can be compensated by suitably adjusting the acid-acid salt concentration in the pad bath; by increasing the acid-acid salt concentration the necessity of employing unduly severe cures can be avoided.

With sodium bisulfite, optimum performance is obtained with a system containing 10 pounds citric acid, 20 pounds magnesium nitrate and 80 pounds sodium bisulfite in a 100 gal. pad bath. In this combination satisfactory performance is obtained when the bisulfite is employed in the range of from about 30 to 100 lbs.

Using the foregiong 10–20 citric acid-magnesium nitrate standard, barium nitrate give satisfactory performance when employed in the range from 12–16 pounds and optimum performance is obtained at about 14 pounds. When sodium nitrite is used as the reducing agent in the 10–20 combination, there is a very limited working range of 3–5 lbs. with optimum results being obtained with about 4 pounds of sodium nitrite.

Throughout this specification, unless otherwise stated, when values or parts are given for citric acid, magnesium nitrate, for sodium hypophosphite and for formaldehyde, these values or parts are always calculated on the basis of citric acid monohydrate, magnesium nitrate hexahydrate, and sodium hypophosphite monohydrate. Formaldehyde values or parts are for the 37% solution of formaldehyde in water. Further, in all of the examples the wetting agent employed was "Triton X-100" (an alkaryl polyether alcohol).

Customarily, the catalyst system of this invention is prepared and sold as an aqueous solution of the various components; in most instances the total concentration of the dissolved system components is such as to form a nearly saturated aqueous solution. Completely saturated solutions have a tendency to precipitate some of the dissolved solids if any evaporation of the solvent occurs or if temperature in the storeroom drops appreciably. From a transportation standpoint, it is preferred to have the solution nearly saturated and thereby save the expense of shipping water. It is also possible to prepare and distribute the catalyst as a dry mix of the various solids or as individually packaged dry components; however, handling by mill hands is subject to less chance of error where the catalyst is in a solution which will enable the desired catalyst charge to be readily measured and incorporated in the pad bath.

To prepare a masterbatch of a 33⅓% (by weight) solution of a preferred catalyst made in accordance with this invention (i.e., 10 parts citric acid, 20 parts magnesium nitrate hexahydrate and 16 parts by weight sodium hypophisphite) the following quantities are used:

| | Pounds |
|---|---|
| Citric acid | 100 |
| Magnesium nitrate hexahydrate | 200 |
| Sodium hypophosphite | 160 |
| Water | 920 |

The solid ingredients are carefully weighed and added either separately or together to approximately 500 pounds of water—preferably, to hasten dissolution hot water at 140°–150° F. After the solids have been completely dissolved the remaining 167 pounds of water is added. Thorough agitation is also helpful in assisting in the dissolution of the solid components. A master batch prepared in this way can be effectively used in preparing the pad bath; 138 pounds of the catalyst master batch, when used to make up the conventional 100 gallon (U.S.) pad bath will incorporate therein 1.25 parts by weight (of the pad bath) citric acid, 2.50 parts by weight magnesium nitrate hexahydrate and 2.00 parts by weight sodium hypophosphite. Such concentrations have been found to be highly effective catalysts in the curing of cottons which have been impregnated with formaldehyde.

In cases where it is desirable to do so, other auxiliaries can be incorporated in the catalyst master batch, for example, it is possible to incorporate acrylic emulsion such as Rhoplex HA-8 in the catalyst master batch in proportions which will provide the desired concentration of the acrylic emulsion in the pad bath. (Rhoplex HA-8, Resyn 25-2833, Rhoplex HA-4, Rhoplex HA-12 and Rhoplex B-27 are acid polymerizable acrylic copolymer emulsions with a non-ionic emulsifying agent and they are used to modify the hand and in certain situations enhance resilience and wash and wear properties. The acrylic emulsions are particularly useful supplemental auxiliaries where the fabric is a blend of cotton with other textile fibers, especially where the cotton constitutes a substantial (e.g. 20% or more) portion of the blend, as they help in maintaining the abrasion resistance.)

In making up pad baths for methylenating treatments with formaldehyde, the catalyst is preferably added to the mix containing the formaldehyde just before using and the bath is then brought to the desired volume and thoroughly mixed. However, the baths themselves are highly stable and despite the presence of the acidic catalyst and can, in closed systems, stand for prolonged periods without deleterious effects.

The following examples will serve to illustrate in greater detail some of the various features of the invention. While the following examples are primarily concerned with treating cellulosics to impart an all-over non-mechanical finish effort to the fabric, the process and catalyst system should not be deemed to be limited thereby. Both the method and the catalyst system can be effectively utilized in any other type of fabric finishing process where it is necessary to cure one or more acid curable finishing agents which have been applied to the fabric. Such other processes may involve localized or all-over application of the finishing agent; and if desired, the process may also involve mechanically treating the fabric to alter the shape and relative disposition of the yarns—as for example by calendering, pleating, ruffing, and the like.

*Example 1*

A pure mercerized cotton (80 x 80, running 3.50 yards/lb.) which had been bleached and tinted, was padded through an impregnating bath having the following formulation:

| | Parts by weight |
|---|---|
| Formaldehyde | 25 |
| Citric acid | 1.25 |
| Magnesium nitrate | 2.50 |
| Sodium hypophosphite | 2.00 |
| Wetting agent | 0.25 |
| Water | 69.00 |
| | 100.00 |

The padding was controlled to provide about 65% solution pick up. The fabric was carefully dried, cooled and then cured for 3 minutes at 270° F. The cured fabric was washed thoroughly with 2% sodium perborate and ¼% wetting agent solution, rinsed and dried. The resulting fabric has good wet and dry resilience and with good stabilization, the strength losses were significantly less than those occurring when the reducing agent was not present in the impregnating bath. A portion of the impregnated fabric was cured for 30 seconds at 400° F. The resulting fabric was slightly weaker but otherwise generally comparable to the fabric cured at 270° F.

*Example 2*

Example 1 was repeated using the same impregnating bath but with the addition of 3.75 parts by weight of Rhoplex HA-8 (acid polymerizable acrylic emulsion) and with the exception that the cure was carried out at 300° F. The resilience of the treated fabric was superior and the wash and wear properties which were slightly better than the fabric treated in Example 1.

When 5 parts of Rhoplex HA-8 were used instead of 3.75 parts of Rhoplex HA-8 no significant changes were observed. However, when 1.25 parts of Rhoplex were employed with a milder cure (3 minutes at 270° F.), strength values were enhanced but there was a slight lowering of the resilience and wash and wear properties.

*Example 3*

Example 1 was repeated except that the cure was carried out for 3 minutes at 280° F. and the impregnating bath had the following formulation:

| | Parts by weight |
|---|---|
| Formaldehyde | 30 |
| Succinic acid | 5 |
| Magnesium nitrate | 2.5 |
| Sodium hypophosphite monohydrate | 2.0 |
| Wetting agent | 0.25 |
| Water | 60.25 |

The properties of the finished fabric were very similar to those obtained in Example 1.

*Example 4*

Example 1 was repeated except that the cure was carried out for 3 minutes at 300° F. and the impregnating bath had the following formulation:

| | Parts by weight |
|---|---|
| Formaldehyde | 99.05 |
| Hydrochloric acid (conc.) | 0.5 |
| Nickelous chloride | 0.2 |
| Sodium hypophosphite | 0.25 |

The fabric treated in this manner had good wet and dry resilience. The wash and wear properties were good but somewhat inferior to those imparted in Example 1.

Example 5

Example 1 was repeated except that the impregnating bath had the following formulation:

| | Parts by weight |
|---|---|
| Formaldehyde | 25 |
| Citric acid | 1.25 |
| Calcium nitrate | 5.00 |
| Sodium hypophosphite | 2.00 |
| Water | 66.75 |

The fabric treated in this way had good self ironing properties, the strength values however, were somewhat inferior to the fabric of Example 1.

Example 6

Example 1 was repeated except that the cure was for 3 minutes at 240° F. and the impregnating bath had the following formulation:

| | Parts by weight |
|---|---|
| Formaldehyde | 20.00 |
| Citric acid | 1.25 |
| Magnesium nitrate | 2.00 |
| Sodium hypophosphite | 0.2 |
| Water | 76.55 |

A self ironing fabric having a soft hand was obtained. The strength values were inferior to those obtained in Example 1.

Example 7

Example 1 was repeated except that the cure was effected for 3 minutes at 300° F. and the impregnating bath had the following formulation:

| | Parts by weight |
|---|---|
| Formaldehyde | 25 |
| Citric acid | 1.25 |
| Magnesium nitrate | 2.50 |
| Sodium bisulfite | 10.00 |
| Water | 61.25 |

The overall properties of the finished fabric were very similar to those obtained in Example 1, i.e., good strength and resilience.

Example 8

Example 1 was repeated using an impregnating bath having the following formulation:

| | Parts by weight |
|---|---|
| Formaldehyde | 30 |
| Acrylic acid | 10 |
| Magnesium nitrate | 2.50 |
| Sodium hypophosphite | 1.00 |
| Water | 56.50 |

One portion of the fabric was cured for 5 minutes at 250° F. and another portion was cured for 3 minutes at 300° F. In both cases the fabrics from an overall standpoint of properties were comparable to the finished fabric of Example 1. The portion cured at 300° F. had somewhat greater resilience and wash and wear properties than the portion cured at 250° F. but at the same time it was somewhat weaker.

Example 9

Example 1 was repeated except that 35.7 parts of glyoxal (50%) were substituted for the 25 parts of formaldehyde. The resultant fabric was slightly weaker but otherwise generally comparable to that obtained in Example 1.

Example 10

Example 1 was repeated except that the cure was effected by heating for 30 minutes at 180° F. and the impregnating bath had the following formulation:

| | Parts by weight |
|---|---|
| Formaldehyde | 25.0 |
| Citric acid | 1.5 |
| Calcium nitrate tetrahydrate | 3.0 |
| Magnesium hypophosphite hexahydrate | 1.5 |
| Water | 70.00 |

The finished fabric was from an overall property standpoint, generally comparable to that obtained in Example 1.

Example 11

A pure fabric of the type employed in Example 1 was padded through an impregnating bath having the following formulation:

| | Parts by weight |
|---|---|
| Formaldehyde | 5 |
| Citric acid | 0.5 |
| Magnesium nitrate | 0.25 |
| Sodium hypophosphite | 0.4 |
| Wetting agent | 0.25 |
| Water | 93.6 |

The impregnated fabric was then treated as in Example 1 except that the heating was for 3 minutes at 300° F. The resulting fabric had a pleasing hand with good stabilization and exceptionally high strength values in view of the degree to which the resilience was enhanced.

Example 12

Example 1 was repeated except that the pad bath also included 10 parts by weight of Rhonite D-12 (dimethylol triazone—50% solids) and the cure was at 300° F. The thus treated fabric was superior to the fabric of Example 1 from the standpoint of wash and wear properties and also from the standpoint of strength.

Example 13

Example 1 was reepated except that the pad bath also included 7½ parts by weight of Rhonite R-1 (dimethylol ethylene urea—50% solids) and the cure was at 300° F. The thus treated fabric was superior to the fabric of Example 1 from the standpoint of wash and wear properties. The resilience was superior to the fabric of Example 1. Further, after severe washing in the presence of a hypochlorite bleach the strength damage due to retained chlorine (AATCC Tentative Test Method 92-1958) was far less than that customarily encountered in fabric finished with dimethylolethylene urea alone and cured with conventional catalyst.

Example 14

Example 1 was repeated but following the cure the unwashed fabric was passed through a second pad bath having the following formulation:

| | Parts by weight |
|---|---|
| Rhonite D-12 (50% solids) | 10 |
| Wetting Agent (Triton X-100) | 0.12 |
| Water | 89.9 |

The thus treated fabric was carefully dried, cured for 3 minutes at 300° F. and then washed and dried as in Example 1. The wash and wear enhancement obtained in Example 1 were retained, the strength losses remained substantially unchanged and there was a significant improvement in the wet and dry resilience over the fabric of Example 1.

Example 15

Example 14 was repeated but 6 parts by weight Rhonite R-1 was substituted for the triazone resin. Results were similar to those obtained in Example 14. Further, and after severe washing in the presence of a hypochlorite bleach the strength damage due to retained chlorine (AATCC Tentative Test Method 92–1958) was far less than that encountered in fabrics finished with dimethylol ethylene urea alone and cured with conventional catalysts.

Example 16

An impregnating bath containing:

| | Parts by weight |
|---|---|
| Formaldehyde | 15 |
| Magnesium nitrate | 1.5 |
| Citric acid | 0.68 |
| Sodium hypophosphite | 0.17 |
| Water | 82.7 | was padded on a rayon challis, the impregnated fabric was dried and cured for 5 minutes at 275° F. The cured fabric was washed in 0.5% NaOH and ¼% wetting agent, rinsed and dried. A fabric of superior wash and wear properties and stabilization was obtained.

Example 17

A pure fabric of the type employed in Example 1 was padded through an impregnating bath having the following formulation:

| | Parts by weight |
|---|---|
| Gluteraldehyde—25% | 113 |
| Citric acid | 1.25 |
| Magnesium nitrate | 2.50 |
| Sodium hypophosphite | 2.00 |
| Wetting agent | .25 |

The fabric was treated as in Example 1. Good wash and wear properties were imparted and the strength of the treated fabric was superior to that of similarly treated fabric where the reducing agent was not present in the catalyst system.

I claim:

1. In a process of methylenating cellulose textiles involving steeping the cellulose in an aqueous solution of an aldehyde compound and curing the thus treated cellulose at temperatures of from 185° to 400° F. for from 30 minutes to 30 seconds in an acid environment capable of catalyzing methylenation, the improvement wherein the acid curing environment is provided by a catalyst dissolved in the aqueous aldehyde treating solution that comprises an acid, an acid salt and a reducing agent, said acid being a polybasic organic acid, said acid salt being a polyvalent metal salt of a Lewis acid and said reducing agent being a metal compound having its reducing activity in the anionic portion of the molecule, said reducing agent being selected from the group consisting of alkali metal and alkaline earth metal hypophosphites and nitrites.

2. The process according to claim 1 wherein the aldehyde is formaldehyde.

3. The process according to claim 1 wherein the acid salt and the reducing agent are compounds of different metals.

4. The process according to claim 1 wherein the reducing agent is sodium hypophosphite.

5. The process according to claim 2 wherein the catalyst is about 1% of the weight of the aqueous formaldehyde treating solution and consists of citric acid, magnesium nitrate and sodium hypophosphite wherein the weight ratio of the citric acid to the magnesium nitrate (calculated as the hexahydrate) is one part citric acid to from about 1 to 7 parts magnesium nitrate; and the weight ratio of the citric acid to the sodium hypophosphite is one part citric acid to from about 0.6 to 2.4 parts sodium hypophosphite.

6. The process of claim 2 wherein the aqueous formaldehyde treating solution also contains a triazone.

7. The process of claim 2 wherein the heat cured unwashed textile is impregnated with an aqueous solution of a cyclic methylol urea and then heating the thus treated textile to dry cure and fix the cyclic methylol urea.

References Cited by the Examiner

UNITED STATES PATENTS

| | | | |
|---|---|---|---|
| 2,436,076 | 2/1948 | Pfeffer | 8—116.4 |
| 2,441,859 | 5/1948 | Weisberg | 8—116.4 |
| 2,512,195 | 6/1950 | Bener | 8—115.6 |
| 2,525,144 | 10/1950 | Mavity | 252—428 |
| 2,530,175 | 11/1950 | Pfeffer et al. | 8—116.4 |
| 2,582,961 | 1/1952 | Burnell et al. | 8—116.3 X |
| 2,593,720 | 4/1952 | Bielawski | 252—428 |
| 2,859,136 | 11/1958 | Marsh et al. | |
| 2,870,041 | 1/1959 | Waddle et al. | 8—116.3 X |
| 2,957,746 | 10/1960 | Buck et al. | 8—116.3 X |
| 2,966,473 | 12/1960 | Biefeld | 260—29.4 |
| 3,005,792 | 10/1961 | Craig et al. | 260—29.4 |
| 3,006,879 | 10/1961 | Ryan et al. | |
| 3,080,281 | 3/1963 | Fischer et al. | |

OTHER REFERENCES

Reeves et al.: American Dyestuff Reporter, Sept. 5, 1960, pages 27–32.

NORMAN G. TORCHIN, *Primary Examiner.*

MORRIS O. WOLK, *Examiner.*

H. WOLMAN, *Assistant Examiner.*